…

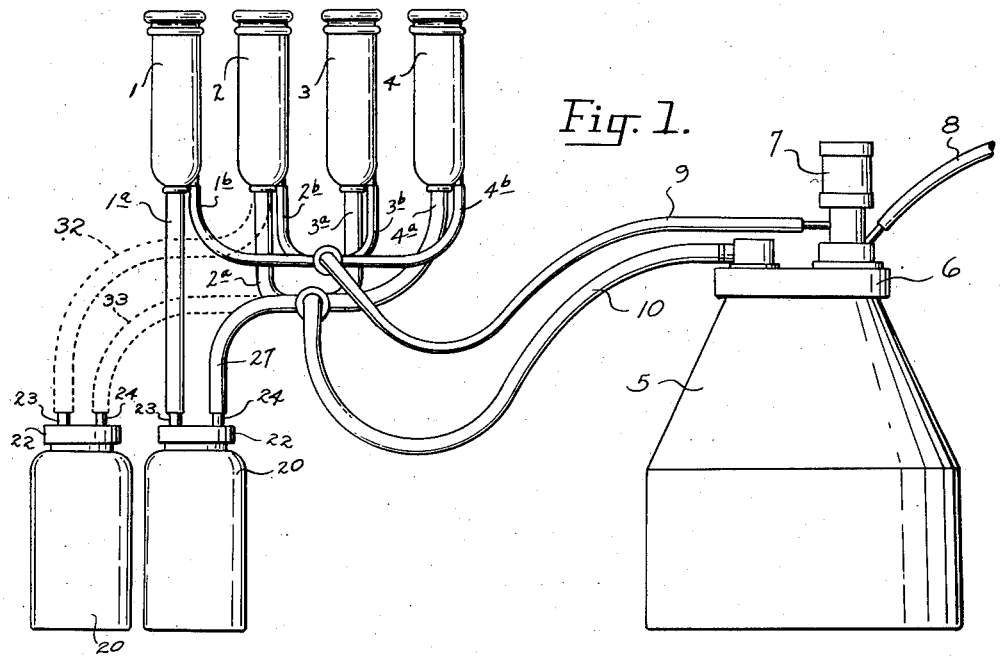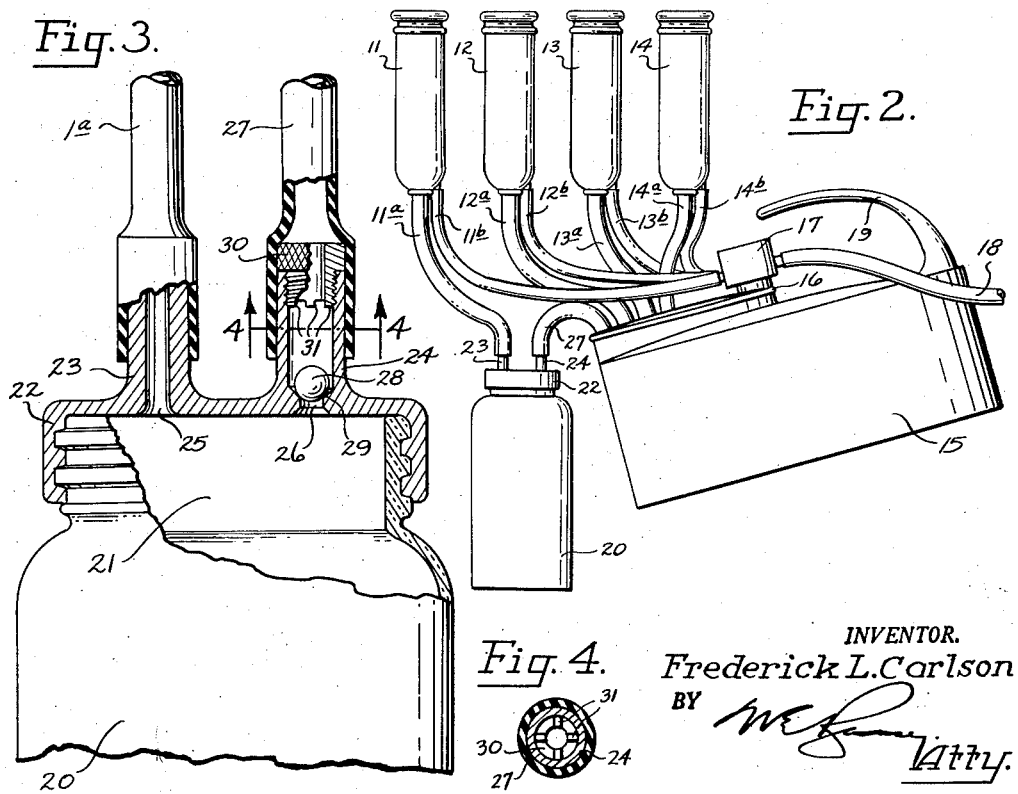

United States Patent Office 2,703,067
Patented Mar. 1, 1955

2,703,067

QUARTER MILKER

Frederick L. Carlson, Estacada, Oreg.

Application May 5, 1951, Serial No. 224,799

2 Claims. (Cl. 119—14.01)

This invention relates to a quarter milker or trap-like accessory for a vacuum-type milking machine whereby milk from an individual injured or diseased quarter may be collected separately so as not to intermix with or contaminate the milk from the other sound quarters. Optionally, two or more quarter milkers may be used concurrently on two or more quarters either to separate bad from good milk or to test the production volume from individual quarters.

A complete understanding of my invention must be bottomed initially, upon an understanding of the character and treatment of the disease, mastitis, the most prevalent and costly disease of dairy cows. Mastitis or garget, an inflammation of one or more quarters of the udder, may be noninfectious or may be a septic, an acute, subacute, or a chronic infection. *Streptococcus agalactiae*, commonly known as "strep," is the organism isolated from 70 to 80 per cent of cows with infectious mastitis. There are, however, several other organisms, including staphylococci, or "staph," *Escherichia coli*, and corynebacteria which may cause mastitis in a more severe, acute form. These bacteria gain entrance to the udder through the teat canal although this is not the only infectious route—mastitis often being associated with injury to the udder, such as bruises, cuts, and scratches. This is because the organisms associated with mastitis are opportunists and promptly grow and produce disease in injured tissue.

While mastitis does not usually cause death, it does affect the milk-producing tissue of the infected quarter—commonly reducing overall milk flow 20 to 25 per cent. The modern treatment of infected dairy cows to eliminate mastitis organisms involves the udder infusion of either "penicillin" or "aureomycin"—the latter being a recently developed antibiotic produced from the growth of the mold *Streptomyces aureofaciens*. The cost of "penicillin" is now low enough so that veterinarians and dairy farmers can afford to use it widely. Either medicine, however, exerts an exceedingly powerful activity against infections, is a non-irritant upon udder tissue, and usually produces no decrease in the milk flow from the treated quarter. Obviously, however, the milk from a treated quarter should not be mixed with the milk from other healthy quarters nor should contaminated milk be sold for human consumption.

Turning now to the special impact which mastitis and the treatment thereof have had upon the dairymen of Oregon, Wisconsin, and upper state New York, an understanding of the cheesemaking art, as practiced in these areas, is important. Scientific cheesemaking includes the pasteurization of all milk brought to the cheese factory in order to kill undesirable bacteria. Thereafter, the cheesemaker adds to the pasteurized milk a culture of selected organisms commonly called a "starter." This starter includes ferments that work well together to produce cheese of superior quality. By guarding the uniformity of the starter, the cheesemaker can expect uniform, high quality, cheese. Many starters, however, are not working reliably nowadays.

The cause of the present starter difficulty recently has been traced to the treatment of mastitis as practiced by a majority of informed dairymen and veterinarians. This treatment, as before mentioned, includes the udder infusion of "penicillin" or "aureomycin" in a non-irritating base which is lighter than milk. In addition, however, this treatment requires the continued regular 12-hour milking of the treated quarter. In fact, incomplete milking increases the likelihood of reinfection. Such milking, however, brings down milk carrying some of the antibiotic. Furthermore, there are today over 683,000 vacuum-type milking machines in use in the United States (1950 U. S. Census figures) and each and every one of these machines functions to collect the milk from all four quarters in one common pail—there is, to the best of my knowledge, no known method for machine milking all four quarters while separately collecting the milk from a treated quarter. Such separate collection, then, is one object of my invention.

Referring again to the cheesemaking art, pasteurization appears to have little if any effect upon the action of "penicillin" and "aureomycin." Furthermore, it has been determined that these two antibiotics, after surviving pasteurization, attack and inhibit the growth of the cheesemaker's starter—a mere trace of either in a huge batch of cheese being sufficient to make the starter behavior so erratic as to render the finished product unsalable. Still further, antibiotics do not disappear immediately after infusion but, instead, "hang on" for a number of days, veterinarians agreeing that traces will be found in the milk from a treated quarter for 72 hours or more after infusion. The cheesemaker has a very real stake in the effective control of mastitis and in the selective purchase and condemnation of milk from dairy cows having treated quarters.

Faced with the apparent incompatability of machine milking a treated cow (complete machine milking is known to aid the therapeutic action of the antibiotic) and maintaining the milk salable to their major markets (including the cheesemaker), America's dairymen, annually, have been forced to waste a huge volume of milk. Either the cow had to be hand milked or the entire milk production wasted. This apparent incompatability and this unnecessary waste have guided my inventive thinking and experimentation. Accordingly, one of the prime objects of my invention is to provide a quarter milker accessory for attachment to a vacuum-type milking machine whereby milk from a selected one or more quarters of a cow may be by-passed and may be collected separately so as not to contaminate the milk from other, healthy, quarters.

Another object of my invention is to increase the utility of the vacuum-type milking machine by allowing the use of the same even while a dairy cow is infected with and is being treated for mastitis, all to the mutual benefit of the dairyman and the cheesemaker.

Yet another object of my invention is to provide a plurality of quarter milker accessories which may be used concurrently for the separate collection of milk from each quarter of a dairy cow, thereby providing an accurate test of individual quarter production volume and quality.

These and other objects and advantages of my invention will be set forth in the following detailed description taken in conjunction with the accompanying drawing, in which:

Fig. 1 is a side view of a long tube or low vacuum-type milking machine showing one of my quarter milkers attached between one selected teat cup and the common milk flow hose thereof and indicating, in dashed outline, the manner in which a second quarter milker may be attached to a second teat cup and to the milk flow hose;

Fig. 2 is a side view of the short tube or surcingle-type milking machine showing the manner in which one of my quarter milkers is attached thereto;

Fig. 3 is an enlarged detail view, partially broken away, showing the removable cap and fittings for my quarter milker and indicating, in the right hand fitting, the reciprocal ball-type check valve which may be used to prevent back flow into the container; and Fig. 4 is a section view, taken substantially on the line 4—4 of Fig. 3, showing the four-prong construction of the check valve stop which may be used in one form of my invention.

I have termed my milking machine accessory a "quarter milker" because it collects or traps separately the milk from one quarter of a dairy cow. To this end, I have shown the invention in combination with two of the most common vacuum-type milking machines. In Fig. 1, the long tube or low vacuum-type milker includes four teat cups 1, 2, 3, and 4. Each teat cup is conventional and teh details thereof form no part of my inventive concept. Suffice to say, each teat cup is a hollow shell, the bore of which is open to one of the milk lines 1a to 4a, inclusively, and the hollow shell surrounding which is open to one of the vacuum lines 1b to 4b, inclusively.

To the right in Fig. 1, I have shown a milk collection pail 5 having a removal lid 6 which carries the conventional pulsator 7. A vacuum line 8 is joined to the pulsator housing and is maintained under a reduced air perssure at all times by means of a gasoline or electric powered vacuum pump (not shown). A common pulsator line 9 interconnects the pulsator 7 with each of the pulsating vacuum lines 1b to 4b, inclusively. Similarly, a common milk collection hose 10 leads from each of the milk lines 2a, 3a, and 4a to the pail 5. With the conventional milking machine and, when my quarter milker accessory is not in use, the milk line 1a also will be joined to the common milk collection hose 10.

Each quarter milker of my invention includes an open mouth container 20 having a fluid chamber 21 therein. If desired, this container may be transparent so the dairyman can observe the volume of milk drawn down and see whether it includes any blood or infection. A cap 22 is screw threaded or otherwise removably secured across the open mouth of the container 20. This cap is provided with a pair of fittings 23 and 24 having apertures 25 and 26 therethrough. As shown in Fig. 1, the fitting 23 receives the milk line 1a and the fitting 24 receives the hose 27 for connection with the aforementioned common milk collection hose 10.

If desired, the fitting 24 may be provided with a back flow prevention means. In Fig. 3, this means has taken the form of a ball-type check valve 28 which is free to reciprocate between a seat 29 and a stop 30. To this end, the stop 30 is provided with four prongs 31 which serve to stop the check valve 28 yet which allow the flow of air through the slots defined between the prongs.

In operation, my quarter milker can be used singly, in pairs, three at a time, or four at a time and in conjunction with any conventional milking machine. In milking a treated quarter which is infected with mastitis, but one quarter milker is required. In Fig. 1, however, I have shown the manner in which additional quarter milkers may be attached. To this end, and as is indicated in dashed outline, the fitting 23 may be joined to the bore of the teat cup 2 by means of a milk line 32 and the fitting 24 may be joined to the common milk collection hose 10 by means of a line 33. A convenient method of accomplishing such connections includes the disconnection of the milk line 2a from the common milk collection hose 10 and the reconnection thereof to the fitting 23. Thereafter, an added length of hose 33 may be supplied for joining the fitting 24 to the milk collection hose 10.

Since the operation of each quarter milker is similar, a typical sequence will be described with reference to but one quarter milker, as shown in full lines in Fig. 1. As is conventional, each of the teat cups 1 to 4 inclusive is secured to one quarter of a dairy cow, the teat cup 1 being secured to that particular quarter which has been treated or which it is desired to test. Thereafter, the vacuum pump is started in order to maintain the vacuum line 8 under a reduced air pressure. The pulsator 7 serves to induce pulsations in the common pulsator line 9 as will be understood by those skilled in the art. The pulstaions induced upon the hollow shells of the teat cups 1 to 4 inclusive exert a cyclic squeeze operation upon the teat of the cow to simulate skillful hand milking. As the milk comes down, it is drawn through each of the milk lines 1a to 4a inclusive by means of the reduced air pressure which exists in both the milk collection pail 5 and the common milk collection hose 10. The milk from the teat cups 2, 3, and 4 flows directly to the milk collection pail 5 through the hose 10 whereas the milk from the teat cup 1 flows into my container 20 through the milk line 1a. Accordingly, the milk from the treated quarter teat cup 1 is collected or trapped separately by the container 20 so as not to contaminate the good milk collected by the pail 5.

While the lines 10 and 27 are maintained under a reduced air pressure at all times, it may be desirable, in certain instances, to provide a means for preventing back flow from the hose 10 into the quarter milker container 20. If so, the ball check valve 28, stop 30, and valve seat 29 may be provided in the fitting 24 as shown in Fig. 3. This check valve seats on the valve seat 29 should any inadvertant back flow start through the line 27 yet it allows air to flow out the aperture 26 and through the slots between the prongs 31 whenever the milker is functioning correctly.

Turning now to Fig. 2, I have shown a short tube or surcingle-type milking machine having a milk collection pail 15 provided with a handle 19. This milker includes a removable lid 16 carrying a pulsator 17 which is joined to a vacuum pump (not shown) by means of the vacuum line 18. In this type milker, however, no common milk collection hose is provided. Instead, each of the teat cups 11, 12, 13, and 14, is provided with a milk line 11a to 14a leading directly to the pail 15. Similarly, the hollow shell surrounding each teat cup is provided with an individual pulsating vacuum line 11b to 14b inclusive. Conventionally, the milk collection pail 15 is suspended from a dairy cow by means of a surcingle strap (not shown). Because no common milk collector hose is used with this machine, I apply the term "milk collector" to the pail 15.

The operation of the quarter milker used in conjunction with the surcingle-type milking machine in Fig. 2 is similar to the operation of that used in conjunction with the milker of Fig. 1. To this end, the chamber within the milk pail 15 is maintained under a reduced air pressure to draw the milk from the hollow bore of each teat cup 12, 13, and 14 and to cause the milk from the teat cup 11 to collect within the container 20. Experience has led me to believe, however, that the optional check valve construction of Fig. 3 will seldom be required when my quarter milker accessory is used with the surcingle-type milker. This is for the reason that each milk line 12a, 13a, and 14a is joined directly to the milk pail 15 rather than to a common milk collection hose such as 10. Accordingly, there is less chance of a back flow from the pail 15 through the line 27.

As will now be obvious, my quarter milker can be attached between any selected teat cup and any point of reduced air pressure within a vacuum-type milking machine. For example, the hose 27 in Fig. 1 could be joined directly to the top of the pail 5 or directly to the vacuum line 8 since all that is required to draw the milk from the teat cup 1 into the container 20 is that a vacuum exist within the hollow chamber 21. In most instances, however, it is contemplated that the hose 27 will be secured to some common milk collector such as the milk collection hose 10 in Fig. 1 or the milk collection pail 15 in Fig. 2. Accordingly, my inventive concept is commensurate with these equivalent points of connection for the reduced pressure fitting 24.

Continuing: The operative sequence of operation for my quarter milker—as the cow is milked, the milk from the three good quarters is collected in the pail 5 or the pail 15 whereas the milk from the treated quarter is collected in the container 20. After the dairy cow is completely milked, the milking machine is disassembled for cleaning and the milk in the pail 5 or the pail 15 is sent to market. The only milk which need be wasted is that which collects within the container 20. Accordingly, I have served the objects of my invention by providing a quarter milk accessory for attachment to a vacuum-type milking machine whereby milk from a selected one or more quarters of a cow may be by-passed and collected separately so as not to contaminate the salable milk from other healthy quarters. This invention will increase the utility of the vacuum-type milking machine by allowing the complete machine milking of a dairy cow infected with and treated for mastitis, all to the mutual benefit of the public, dairymen, and cheesemakers.

I claim:

1. In combination, a vacuum type milking machine having four teat cups joined to a milk collector which is maintained under reduced air pressure, a quarter milker intermediately in series with one of said teat cups and said milk collector, said quarter milker including an open mouth transparent container having a fluid chamber therein, a cap removably closing said open mouth and having a pair of fittings communicating with said chamber, a first fluid communication line joining one said fitting to said one individual teat cup, a second fluid communication line joining the other said fitting to said milk collector, and means for preventing a back flow from said milk collector to said fluid chamber, said means including a check valve reciprocable between a stop and valve seat oppositely disposed within the other said fitting.

2. In combination, a vacuum type milking machine having a group of vacuum actuated teat cups communicating directly with a milk collector which is maintained under reduced air pressure, a quarter milker joined in series with another vacuum actuated teat cup and with said milk collector, pulsation means common to all said teat cups for actuating the same, said quarter milker including an open mouth transparent container having a fluid chamber therein, a cap threadably engaging and closing said container open mouth, a pair of fittings carried by said cap and communicating with said fluid chamber, a first fluid communication line joining one of said fittings to said other vacuum actuated teat cup, a second fluid communication line joining the other of said fittings to said milk collector, and means for preventing a back flow from said milk collector to said fluid chamber.

References Cited in the file of this patent

UNITED STATES PATENTS

| | | |
|---|---|---|
| 849,521 | Worcester | Apr. 9, 1907 |
| 1,197,717 | Disbrow | Sept. 12, 1916 |
| 1,519,827 | Fuge | Dec. 16, 1924 |
| 1,534,939 | Fuge | Apr. 21, 1925 |
| 2,627,840 | Mayer | Feb. 10, 1953 |

FOREIGN PATENTS

| | | |
|---|---|---|
| 25,905 | New Zealand | May 4, 1909 |